(No Model.)

J. C. MANNING.
CUTTING TOOL

No. 395,285. Patented Dec. 25, 1888.

Witnesses:
A. Stark,
Wm O. Stark.

Inventor:
John C. Manning,
by Michael J. Stark, Attorney.

UNITED STATES PATENT OFFICE.

JOHN C. MANNING, OF BUFFALO, NEW YORK, ASSIGNOR OF TWO-THIRDS TO GEO. H. CHADEAYNE AND ANSON W. OLMSTEAD, OF SAME PLACE.

CUTTING-TOOL.

SPECIFICATION forming part of Letters Patent No. 395,285, dated December 25, 1888.

Application filed June 14, 1888. Serial No. 277,117. (No model.)

*To all whom it may concern:*

Be it known that I, JOHN C. MANNING, of Buffalo, in the county of Erie and State of New York, have invented certain new and useful Improvements on Cutting-Tools for Wood-Working Machines; and I do hereby declare that the following description of my said invention, taken in connection with the accompanying sheet of drawings, forms a full, clear, and exact specification, which will enable others skilled in the art to which it appertains to make and use the same.

My present invention has general reference to improvements in cutting-tools for wood-working machinery; and it consists, essentially, in the novel and peculiar combination of parts and details of construction, as hereinafter first fully set forth and described, and then pointed out in the claims.

Figure 1:
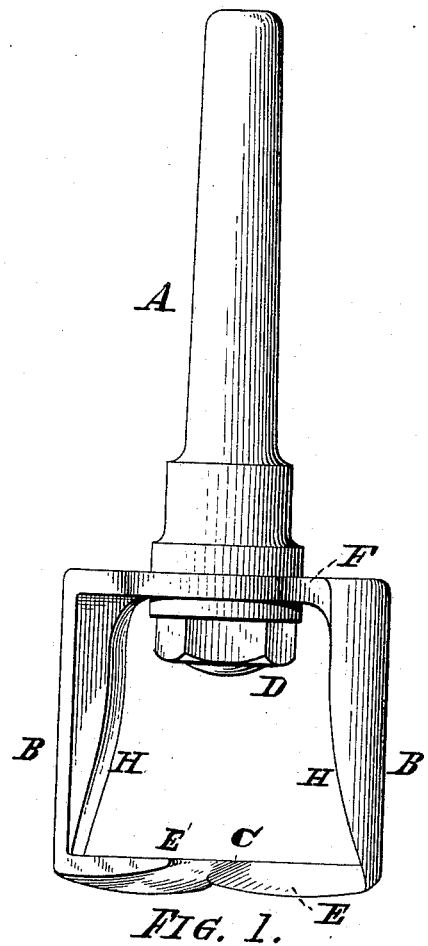
Figure 2:
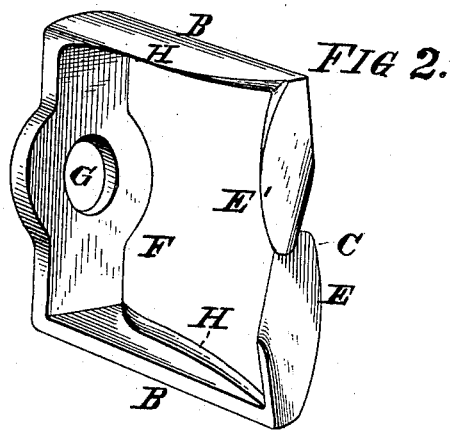

In the drawings already mentioned, which serve to illustrate my said invention more fully, Figure 1 represents in elevation a cutting-tool embodying my invention; and Fig. 2 represents the same in perspective, laid down on its side and without the shank.

Like parts are designated by corresponding letters of reference in all the figures.

The object of my invention is the production of an efficient cutting-tool for boring and mortising machines, &c. To attain this result, I construct a tool substantially as shown in Figs. 1 and 2, said cutters consisting of a shank, A, fitting the usual spindle of the wood-working machine on which it is to be used, two side pieces or tines, B B, and two cutting-lips, E E', which extend inward from said tines B and overlap each other, as shown. The body-piece F of the tool is rectangular as a whole, including said tines and lips. Its rear wall is provided with a central opening, G, for the attachment of the shank A, by means of a nut, D. The tines B are sharp-edged, as shown at H H, to enable the cutter to cut sidewise, as in mortising, paneling, molding, &c., it being evident that such work requires the sides or tines to be shaped in accordance with the form to be produced in the material operated on. The sides of lips E E' are sharp-edged also, their edges facing in opposite directions. Each lip ends in a semicircular cutting-edge. These semicircular lips overlap each other, as shown, and insure greater accuracy and completeness of work at and about the point of such overlapping.

The advantages of a cutter constructed as described are, that the tool provides for a large space to take up the chips, and will therefore work faster and easier and produce more work in a better manner and give better satisfaction than any other cutting-tool with which I am acquainted.

Having thus fully described my invention, I claim as new and desire to secure by Letters Patent of the United States the following:

1. A tool consisting of a shank, a pair of tines extending forward therefrom and having cutting-edges on opposite sides, and a pair of lips extending inward from the ends of said tines and overlapping each other, said lips also having cutting-edges on opposite sides with respect to each other, substantially as set forth.

2. A mortising or similar tool consisting of the shank A, having the locking-nut D, and the cutter proper, F, composed of a rectangularly-shaped body, one side of which is provided with a central aperture, G, for the shank, two opposite sides, B B, having curved cutting-edges H H, and the side having two curved cutting-lips, E E', each of which ends in a semicircular cutting-edge, the entire cutter F being integral, substantially as described, for the object stated.

In testimony that I claim the foregoing as my invention I have hereto set my hand in the presence of two subscribing witnesses.

JOHN C. MANNING.

Attest:
MICHAEL J. STARK,
GEO. H. CHADEAYNE.